United States Patent
Hunt (10) Patent No.: US 10,009,550 B1
(45) Date of Patent: Jun. 26, 2018

(54) SYNTHETIC IMAGING

(71) Applicant: X Development LLC, Mountain View, CA (US)

(72) Inventor: Thomas Peter Hunt, Oakland, CA (US)

(73) Assignee: X Development LLC, Mountain View, CA (US)

( * ) Notice: Subject to any disclaimer, the term of this patent is extended or adjusted under 35 U.S.C. 154(b) by 0 days. days.

(21) Appl. No.: 15/388,884

(22) Filed: Dec. 22, 2016

(51) Int. Cl.
  *H04N 5/225* (2006.01)
  *H04N 5/265* (2006.01)
  *H04N 5/247* (2006.01)

(52) U.S. Cl.
  CPC ............ *H04N 5/265* (2013.01); *H04N 5/247* (2013.01)

(58) Field of Classification Search
  CPC ............ H04N 13/0271; H04N 13/00; H04N 13/0022; H04N 13/0242; H04N 13/0278; H04N 13/0275; H04N 13/0203; H04N 5/23238; H04N 5/3415; G06T 15/00; G06T 17/00; G06T 19/20; G06K 9/20; G06K 9/46
  USPC ............................................. 348/218.1, 239
  See application file for complete search history.

(56) References Cited

U.S. PATENT DOCUMENTS

| | | | | |
|---|---|---|---|---|
| 6,674,461 B1 * | 1/2004 | Klapman | .............. | G06T 3/4007 345/474 |
| 7,307,654 B2 * | 12/2007 | Chang | .................... | G06T 15/10 348/188 |
| 8,164,617 B2 | 4/2012 | Mauchly et al. | | |
| 2002/0122113 A1 * | 9/2002 | Foote | .................... | G06T 3/4038 348/48 |
| 2003/0076413 A1 * | 4/2003 | Kanade | .................. | G06T 15/20 348/139 |
| 2004/0263611 A1 | 12/2004 | Cutler et al. | | |
| 2012/0062756 A1 * | 3/2012 | Tian | .................... | H04N 19/008 348/218.1 |
| 2016/0127657 A1 * | 5/2016 | Mukai | .................... | H04N 7/181 348/38 |
| 2016/0140733 A1 * | 5/2016 | Gu | ...................... | H04N 13/0062 348/43 |
| 2016/0165215 A1 * | 6/2016 | Gu | .......................... | G06K 9/20 348/43 |

OTHER PUBLICATIONS

US 8,027,351, 09/2011, Wilburn et al. (withdrawn)

* cited by examiner

*Primary Examiner* — Kelly L Jerabek
(74) *Attorney, Agent, or Firm* — Fish & Richardson P.C.

(57) ABSTRACT

Methods, systems, and apparatus, including computer programs encoded on a computer storage medium, for synthetic imaging. In one aspect, a method includes receiving from each digital camera respective imaging data, each digital camera having a viewpoint that is different from the viewpoints of each other digital camera and having a field of view that is overlapping with at least one other digital camera; for a synthetic viewpoint that is a viewpoint that is within a geometry defined by the viewpoints of the digital cameras, selecting respective imaging data that each has a field of view that overlaps a field of view of the synthetic viewpoint and generating, from the selected respective imaging data, synthetic imaging data that depicts an image captured from a virtual camera positioned at the synthetic viewpoint.

16 Claims, 5 Drawing Sheets

SYNTHETIC IMAGING

BACKGROUND

Video content is common place in many of today's applications. Video conferencing, video feeds from venues, and the like are available options for multiple different applications. Oftentimes viewers of video content, however, may desire video taken from a different perspective than the perspective that the viewer is currently viewing. For example, a viewer may desire a video feed from a camera with a viewpoint that is different from the viewpoint of the camera that is currently providing a video feed to the viewer. A user may thus select a different camera from which to view a video feed. If an array of available cameras, however, does not include a particular camera with a viewpoint that satisfies the user's particular need, then the user's user experience may be less than satisfactory.

SUMMARY

This specification describes systems, methods, devices, and other techniques relating to generating synthetic imaging data to render an image from a synthetic viewpoint. In general, one innovative aspect of the subject matter described in this specification can be embodied in a system comprising for a set of two or more digital cameras, receiving from each digital camera in the set respective imaging data from the digital camera, and wherein each digital camera in the set has a viewpoint that is different from the viewpoints of each other digital camera in the set and has a field of view that is overlapping with at least one other digital camera in the set such that the respective imaging data from each digital camera includes overlapping imaging data from at least one other digital camera; and for each of a plurality of synthetic viewpoints, where each synthetic viewpoint is a viewpoint that is within a geometry defined by the viewpoints of the digital cameras in the set, and each synthetic viewpoint is different from each other synthetic viewpoint: selecting respective imaging data that each has a field of view that overlaps a field of view of the synthetic viewpoint, and generating, from the selected respective imaging data, synthetic imaging data that depicts an image captured from a virtual camera positioned at the synthetic viewpoint. Other embodiments of this aspect include corresponding systems, apparatus, and computer programs, configured to perform the actions of the methods, encoded on computer storage devices.

These and other embodiments can each optionally include one or more of the following features: a system may generate many different synthetic viewpoints from imaging data collected from a set of digital cameras, where each synthetic viewpoint is a unique point of view. For a set of users each on respective devices, the system may provide each user with different synthetic imaging data for displaying a unique image from a correspondingly different synthetic viewpoint.

In some implementations, the system may generate two different synthetic viewpoints to produce a three-dimensional stereoscopic image, where the two different synthetic viewpoints depict two different images, respectively. The three-dimensional stereoscopic image may be presented at a user device for reconstructing a three-dimensional image at the user device.

Additionally, the synthetic viewpoints may have a zoom level different from the actual zoom levels of the digital cameras used to generate the synthetic viewpoint. Furthermore, a synthetic viewpoint can also be generated in response to a gesture captured by at least one digital camera.

In some situations, when generating a synthetic viewpoint, the system will determine if an obstruction is detected in the fields of view of any of the respective digital cameras whose respective imaging data is selected to use in the synthetic viewpoint. Obstructions may be determined by comparing the imaging data of each digital camera to imaging data of other selected respective imaging data for a threshold of similarity in the imaging data where the fields of view of the respective cameras overlap.

For synthetic viewpoints in which an obstruction is determined, the system may generate the synthetic imaging data from only the respective imaging data from the digital cameras that are not determined to be obstructed. The system may also generate the synthetic imaging data from the unobstructed portions of respective imaging data from the digital cameras. Additionally, all of the respective imaging data from the digital cameras, including the obstructed portions of the respective imaging data, can be used in the synthetic imaging data to generate the synthetic viewpoint. In some implementations, a synthetic viewpoint may be generated from a combination of obstructed and unobstructed respective imaging data from the digital cameras.

To reduce oversampling, similarity in the imaging data in the overlapping regions of the fields of view of the set of cameras can be determined, and a proper subset of digital cameras can be selected for use in generating an image from a synthetic viewpoint.

In some implementations, a synthetic viewpoint may be selected based on a gesture of a subject depicted within the imaging data of at least one of the digital cameras. For example, a hand wave or a pointing motion gesture by a person within the imaging data may cause the selection and generation of a synthetic viewpoint in the vicinity of the gesture.

Particular embodiments of the subject matter described in this specification can be implemented so as to realize one or more of the following advantages. The synthetic viewpoint can recreate an image from an arbitrary perspective within the geometry defined by the viewpoints of the set of cameras. The synthetic viewpoint can be, for example, from a perspective of a view coming out of the center of a display, rather than a single camera viewpoint from an edge of the display. The synthetic viewpoint may also reconstruct a perspective that is between two of the digital cameras without moving the digital cameras (e.g., pan or tilt). By generating the synthetic viewpoint in software, the system reduces moving parts and lag time in generating the synthetic viewpoint while digital cameras are moving. This results in systems that are less expensive to construct, are more reliable due to fewer moving parts, and have an increased response time for certain operations. Each of these advantages thus realizes a technical improvement in the field of imaging processing.

Additionally, with a sufficiently large set of digital cameras having overlapping fields of view, a synthetic viewpoint can be generated regardless of obstructions placed in the field of view of one or more of the set of digital cameras. Furthermore, a synthetic viewpoint can offer three-dimensional and/or virtual reality reconstructions from arbitrary positions around a geometry defined by viewpoints of a set of digital cameras. This again results in the ability to provide a video from a wide range of different viewpoints while reducing the number of cameras that would otherwise be required if the cameras are only individually selected. Furthermore, a computer-generated augmented reality object can be combined with a synthetic viewpoint for presentation.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

A system generates synthetic imaging data to render an image from a synthetic viewpoint. The synthetic imaging data used to generate the image from the synthetic viewpoint is generated from imaging data from at least two digital cameras. The field of view of each of the digital cameras overlaps the field of view of the synthetic viewpoint.

A set of multiple digital cameras is arranged such that the viewpoints of the cameras defines a geometry of one-, two-, or three-dimensions. The synthetic viewpoint is located within the geometry. For example, if the cameras are arranged so that their viewpoints define a line segment, the synthetic viewpoint is a point along the line segment. Likewise, if the cameras are arranged so that their viewpoints define a rectangular area in a plan, the synthetic viewpoint is a point along within the rectangular area.

Each digital camera in the set has a different viewpoint than the other cameras in the set. Additionally, each digital camera has some amount of overlap in its field of view with the field of view of at least one other digital camera in the set. For a particular synthetic viewpoint, imaging data from cameras that each has a field of view that overlaps a field of view of the synthetic viewpoint are selected. The system then generates, from the selected imaging data, synthetic imaging data that depicts an image captured from a virtual camera positioned at the synthetic viewpoint. Image processing techniques are used generate the synthetic imaging data from the imaging data of the selected cameras.

In some situations, when an obstruction is detected in the field of view of a particular digital camera, the imaging data from that particular digital camera can be ignored when generating the synthetic imaging data.

To reduce oversampling, the similarity in the imaging data in the overlapping regions of the fields of view of the set of cameras can be determined, and a minimal subset of digital cameras can be selected for use in generating an image from a synthetic viewpoint.

The system may generate many different synthetic viewpoints from the imaging data collected from a set of digital cameras, where each synthetic viewpoint is a unique point of view. For a set of users each on respective devices, the system may provide each user with different synthetic imaging data for displaying a unique image from a correspondingly different synthetic viewpoint. Additionally, the synthetic viewpoints may have a zoom level different from the zoom levels of the digital cameras used to generate the synthetic viewpoint. A synthetic viewpoint can also be generated in response to a gesture captured by at least one digital camera.

Example Operating Environment

Figure 1:
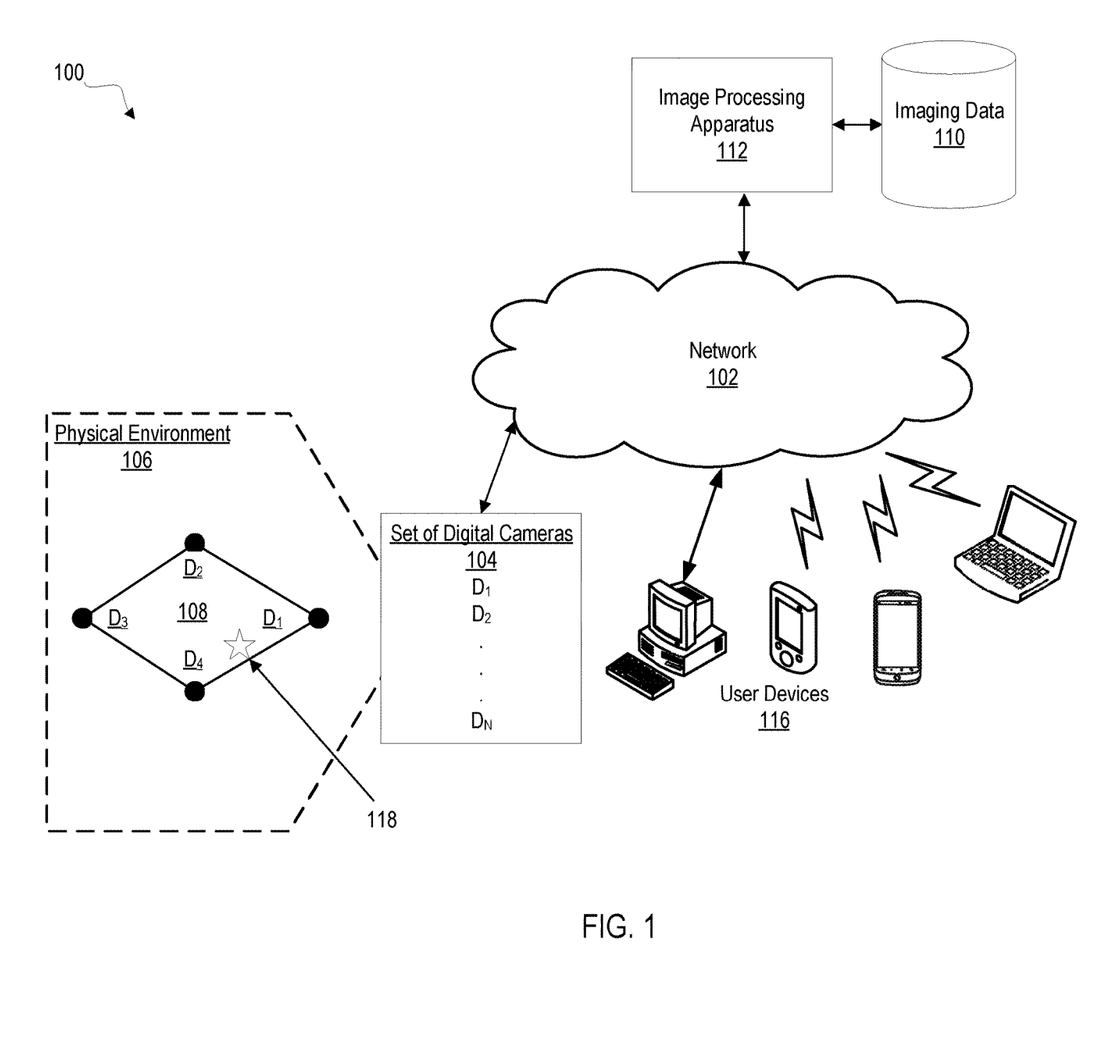
FIG. 1 is block diagram of an example environment in which synthetic viewpoints are generated.

FIG. 1 is a block diagram of an example environment 100 in which synthetic viewpoints are generated. The environment includes a computer network 102, such as the Internet, a local area network (LAN), or the like. The example environment includes at least two digital cameras in a set of digital cameras 104 $D_1, D_2, \ldots D_N$ in communication with the network 102. Digital cameras include: any camera device that encodes digital images and videos digitally, and may also include digital cameras that process imaging data that is outside of the visual spectrum. The set of digital cameras 104 are arranged in a physical environment 106 such that viewpoints of the digital cameras 104 define a geometry 108 (in the arrangement shown in FIG. 1, the geometry is a rectangle with a camera at each vertex).

Physical environment 106 includes the set of digital cameras 104 (D1, D2, D3, and D4). The set of digital cameras is positioned such that the combined viewpoints of the set of digital cameras defines a two-dimensional plane, the details of which are described with reference to FIG. 2.

The set of digital cameras 104 capture imaging data 110 from the respective viewpoints of each of the cameras $D_N$. Methods for capturing imaging data 110 may include single-shot capture, multi-shot capture, or video capture. The imaging data 110 from each of the set of digital cameras 104 includes the imaging data depicting the environment within a field of view of each of the set of digital cameras.

An image processing apparatus 112 (e.g., a data processing apparatus of one or more computers) in communication with the network 102 receives the imaging data 110 from the set of digital cameras 104 and performs image processing on the imaging data 110. Imagining data 110 may include captured video and still images from each of the digital cameras in the set of digital cameras 104. Although the imaging data is represented by a storage element, the processing described below can be accomplished on streaming data.

One or more user devices 116 may receive data from the image processing apparatus 112 to view imaging data provided by the set of digital cameras 104. A user device 116 is an electronic device in communication with the network 102. Example user devices 116 include computers, laptops, mobile phones, tablet computers, teleconferencing systems, and other devices with video/image display abilities.

The image processing apparatus 112 may receive a request from a particular user device 116 for the presentation of a synthetic viewpoint. A synthetic viewpoint is a camera viewpoint that is within the geometry 108 defined by the viewpoints of the set of digital cameras 104, but it not itself the viewpoint of any one particular camera. For example, a user device may request display of physical environment 106 from a particular synthetic viewpoint 118 within physical environment 106.

Imaging Data Processing

Figure 2:
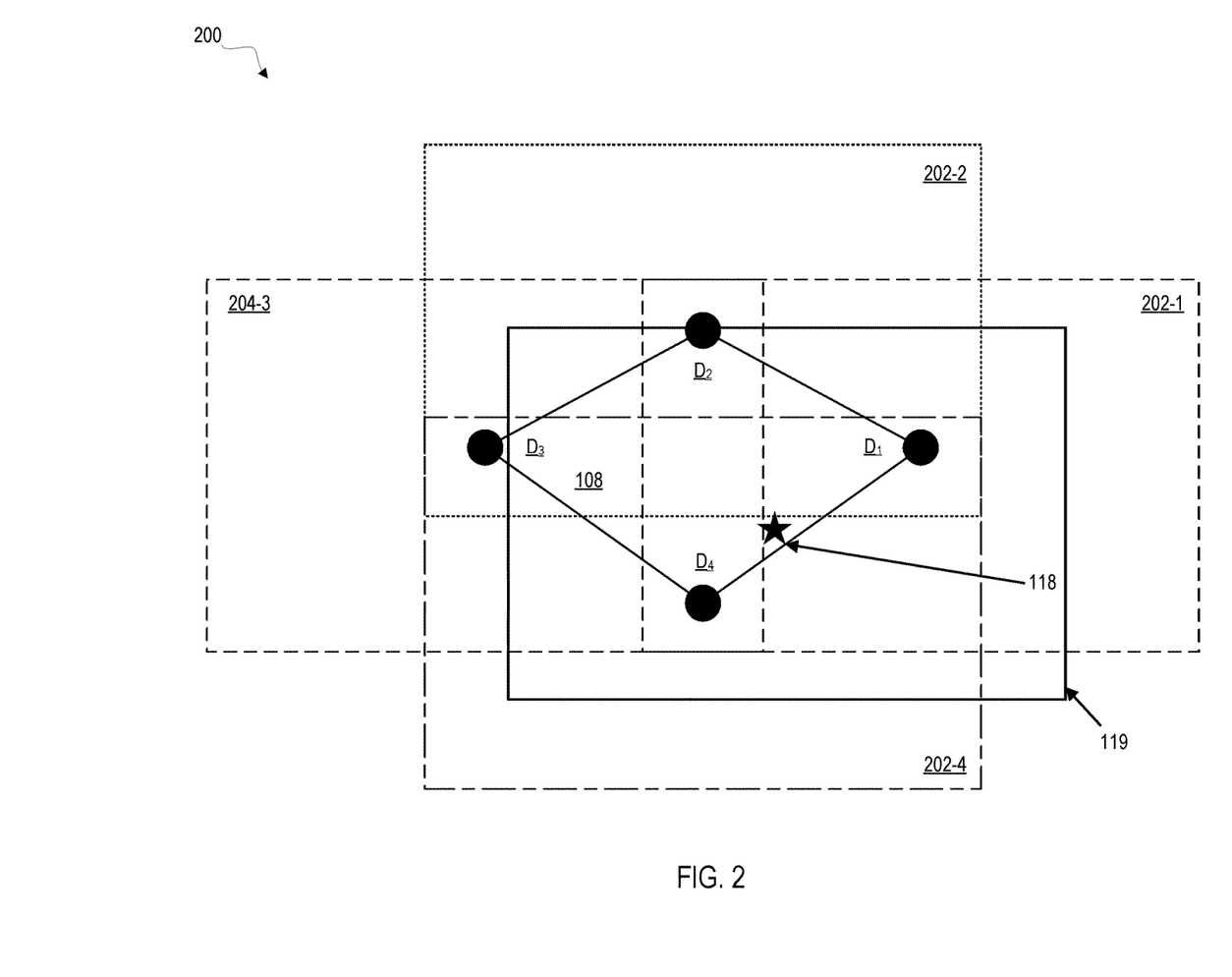
FIG. 2 is a diagram showing an example of a geometry defined by a set of digital cameras with overlapping fields of view for generating a synthetic viewpoint.

FIG. 2 is a diagram showing an example environment 200 of a geometry defined by a set of digital cameras 104 with overlapping fields of view for generating a synthetic viewpoint 118. Digital cameras $D_1$, $D_2$, $D_3$ and $D_4$ with respective fields of view 202-1, 202-2, 202-3, and 202-4 are positioned on a two-dimensional plane 108. For example, a two-dimensional plane 108 may be a screen of a computer, with the four digital cameras $D_1$, $D_2$, $D_3$ and $D_4$ positioned around the perimeter of the screen. In this example, two digital cameras $D_2$ and $D_4$ are positioned vertically on the two-dimensional plane 108, and two digital cameras $D_1$ and $D_3$ are positioned horizontally on the two-dimensional plane to define a geometry 108.

Each of the cameras in the set of cameras $\{D_N\}$ has a field of view 202-N that determines a region in which a camera may capture imaging data. For example, camera $D_1$ capture imaging data within a field of view 202-1, camera $D_2$ captures imaging data within a field of view 202-2, and so on.

A field of view 202 for a digital camera $D_N$ may overlap with another field of view for a different digital camera. For example, a field of view 202-1 for camera $D_1$ overlaps with field of views 202-2, 202-3, and 202-4 for cameras $D_2$, $D_3$, and $D_4$, respectively. In some implementations, a field of view of a digital camera may overlap with at least one other field of view of a different digital camera in a set of digital cameras $\{D_N\}$, but need not overlap with each field of view of each digital camera in the set of digital cameras $\{D_N\}$.

Within the geometry 108 a synthetic viewpoint 118 may be selected. For example, synthetic viewpoint 118 in geometry 108 includes overlapping fields of view 202-1 and 202-4 of digital cameras $D_1$ and $D_4$, respectively. A user can select any synthetic viewpoint within the geometry 108.

Each particular synthetic viewpoint 118 is generated using the respective imaging data 110 for each digital camera 104 whose field of view 202 overlaps with a field of view 119 of the synthetic viewpoint 118. More generally, when the synthetic viewpoint 118 is selected, the image processing apparatus 112 needs to select the imaging data from which to create the image. To do so, the image processing apparatus 112 determines a field of view 119 for the synthetic viewpoint 118. As shown in FIG. 2, the field of view 119 for the synthetic viewpoint 118 may be such that the synthetic imaging data is for an image that is the same size as the images depicted in the imaging data of the actual cameras. For the field of view 119 in FIG. 2, for example, imaging data from each of cameras $D_1$ and $D_4$, whose fields of view 202-1-202-4 overlap with a field of view 119 of the synthetic viewpoint 118, are selected.

For each particular synthetic viewpoint 118, the image processing apparatus 112, using the imaging data 110 from each digital camera $D_N$ whose field of view 202 overlaps with the field of view of the synthetic viewpoint 118, generates synthetic imaging data. The synthetic imaging data depicts an image captured from a virtual camera positioned at the synthetic viewpoint, as described in more detail below with regards to FIGS. 3A and 3B.

While the field of view 119 results in an image that is of the same size as those generated by the actual cameras, the field of view may be for an image that is of a different size that any image depicted in the imaging data of the actual cameras. For example, the synthetic imaging data may have dimensions that are less than the dimensions of the constituent imaging data, or even more than the dimensions of the constituent imaging data. To illustrate, selecting a field of view exactly in the center of the geometry 108 may allow a user to select a panoramic image that spans the overlapping width of the imaging data for fields of view 202-1 and 202-3.

Any appropriate image processing technique may be used to create synthetic imaging data from a particular synthetic viewpoint. For example, for any two cameras with overlapping fields of view, a synthetic viewpoint may be selected along any point defined by a line segment connecting the two camera viewpoints. Using stitching, an image may be generated to depict an image that would be captured by a camera located at the synthetic viewpoint.

Figure 3A:
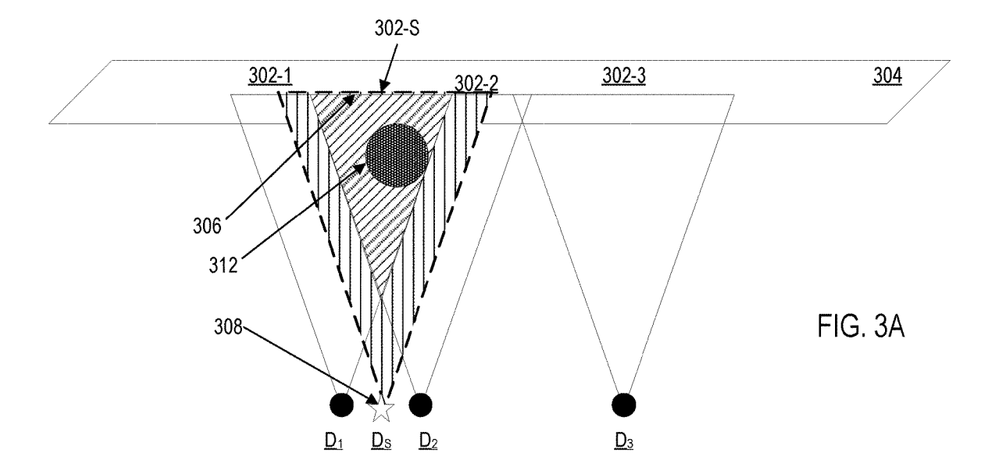
FIGS. 3A and 3B are diagrams showing an example generation of a synthetic viewpoint with an obstruction, and the resulting imaging data and synthetic imaging data.
Figure 3B:
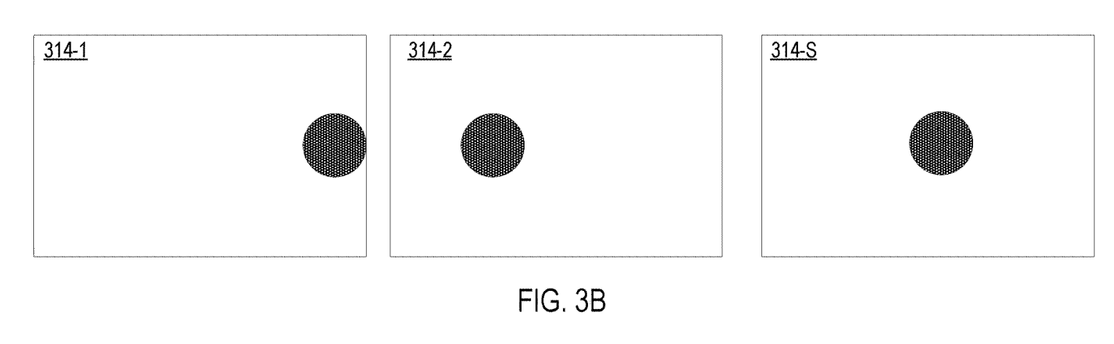

FIGS. 3A and 3B are diagrams showing an example generation of a synthetic viewpoint with an obstruction, and the resulting imaging data and synthetic imaging data for generating the synthetic viewpoint. FIG. 3A depicts a set of digital cameras D1, D2, and D3 with fields of view 302-1, 302-2, and 302-3 respectively. The set of digital cameras is imaging a scene 304. Scene 304 is depicted as a two-dimensional plane but may also a three-dimensional volume.

The fields of view for digital cameras D1 and D2 overlap as defined by the shaded region base 306. The base 306 is depicted in FIG. 3A as a two-dimensional overlap for simplicity, but may be a three-dimensional geometry (e.g., volume), such as in the case when the viewpoints of the cameras DN do not define a plane relative to the scene 304 . . . A synthetic viewpoint 308 is defined within the geometry 306, such that $D_S$ is a virtual camera position at the synthetic viewpoint 308. The synthetic viewpoint 308 is process to have a field of view 302-S at plane 304.

In some implementations, the fields of view for two or more digital cameras that do not overlap may be used to generate an image if there are intermediate overlaps. For example, the fields of view for digital cameras $D_1$ and D3 do not overlap, but the fields of view for digital cameras D2 and D3 do overlap. Thus, the images from the cameras could be used to generate an image, e.g., a stitching of portion of the imaging data in fields of view 302-1, 302-2 and 302-3.

FIG. 3B is an example of the different images 314-1, 314-2, and 314-S generated from the imaging data of each of digital camera $D_1$, $D_2$, and from the synthetic imaging data of virtual camera $D_S$, respectively. Image 314-1 is an image captured by digital camera $D_1$, image 314-2 is an image captured by digital camera $D_2$. Image 314-S is an example of an image generated from synthetic imaging data at synthetic viewpoint 308 (virtual camera $D_S$). Image 314-S includes respective imaging data from 314-1 and 314-2.

Obstruction Processing

Figure 3C:
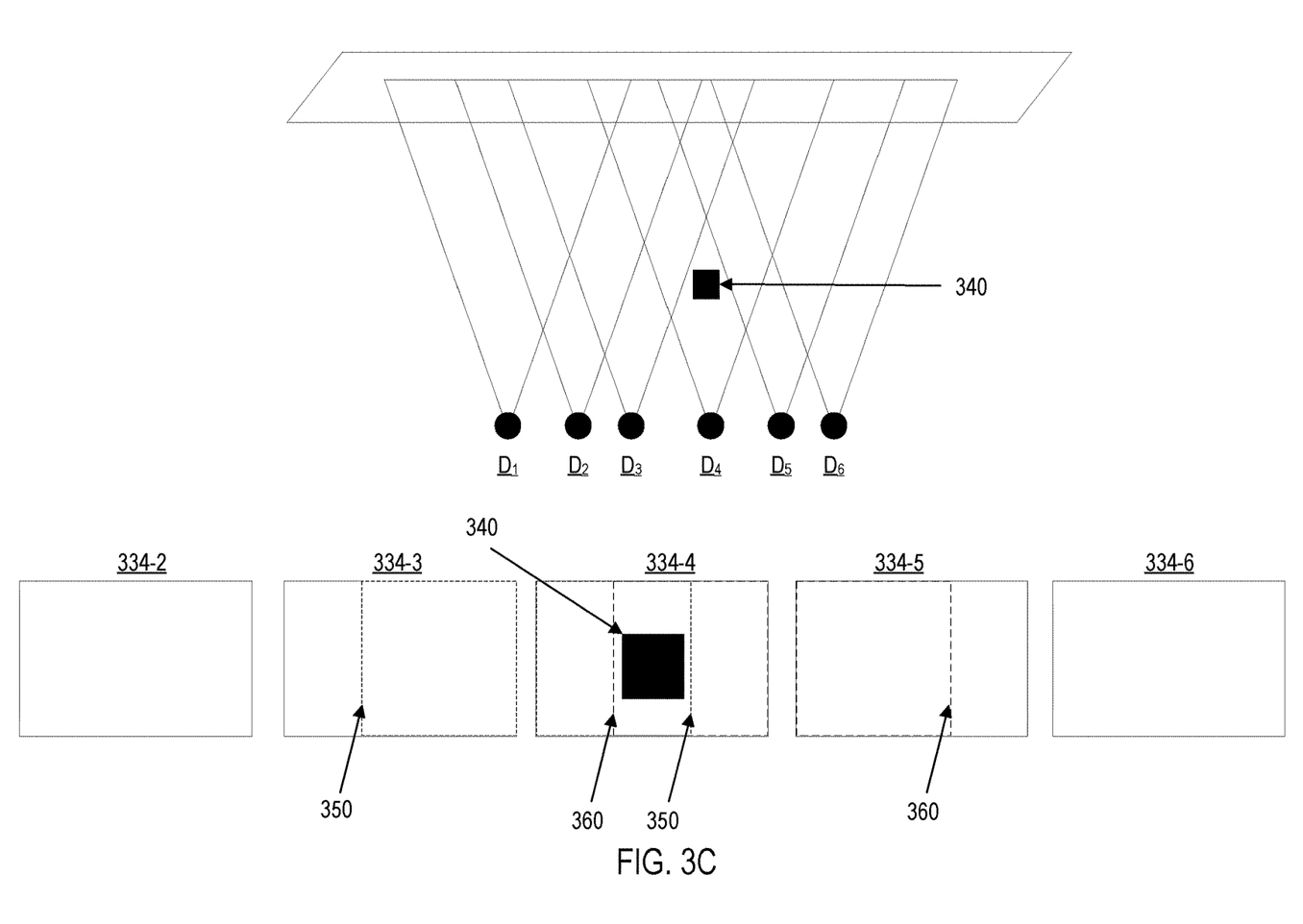
FIG. 3C is a diagram depicting an obstruction that obstructs the view of at least one camera in a set of cameras.

FIG. 3C is a diagram depicting an obstruction 320 that obstructs the view of at least one camera ($D_4$) in a set of cameras. In some implementation, an obstruction can be detected in the selected imaging data that is being used to generate the synthetic imaging data, and the obstruction can be removed from the synthetic imaging data. For example, assume the object 340 is an obstruction is within the fields of view of digital cameras $D_4$. The resulting imaging data for $D_4$ and its overlapping neighbors $D_3$ and $D_5$ are shown below the camera viewpoints as 334-3, 334-4 and 334-5. Additional imaging data for cameras $D_2$ and $D_6$ are also shown. Upon selection of the synthetic field of view $D_S$, the image processing apparatus 112 determines the digital camera is obstructed relative to a subject to be depicted in the synthetic imaging data. Obstructions may be, for example, a person (e.g., a person standing in front of a camera view) or an object (e.g., a car, chair, ball, dirt on a camera lens). Obstructions may be static in the fields of view for one or more digital cameras, or may be temporal (e.g., an object moving past a camera and temporarily blocking it). Additionally, an obstruction may be blocking a portion or the entirety of a field of view of a digital camera.

In some implementations, a digital camera from the set of digital cameras may be determined to be obstructed relative to a subject to be depicted in the synthetic imagining data by using a similarity measure that measures the similarity of portions of overlapping imaging data. For example, a similarity detection process can, for each pair of imaging data selected from sets of imaging data from cameras, align the imaging data based on matching pixels. As depicted in FIG. 3C, the phantom portions 350 of the images 334-3 and 334-4 have, for the most part, very similar pixels, except for the obstructed portion caused by the obstruction 340. A similar mismatch in phantom portions 360 will be detected when the imaging data 334-4 is compared to the imaging data 334-5. Because the obstruction 340 is enclosed within the phantom matching portion of 350 and 360, the image processing apparatus 112 detects the obstructing 340 in the imaging data 334-4.

The obstruction can be processed in a variety of ways so that the resulting synthetic imaging data does not depict the obstruction. In some implementations, generating an image from synthetic imaging data may include only imaging data from the selected digital cameras that are not determined to be obstructed. For example, the set of digital cameras of FIG. 3C, the imaging data of the camera $D_3$ may be discarded and not used to generate synthetic imaging data.

In other implementations, an image generated from synthetic imaging data may include imaging data from all unobstructed portions of the imaging data from the selected digital cameras. For example, for the same set of digital cameras of FIG. 3, all the imaging data from all of the cameras may be used, except for the pixels depicting the obstruction 340 in the imaging data 334-4.

Alternatively, an obstruction need not be removed, and synthetic imaging data may be generated from all imaging data, including portions of the imaging data determined to be obstructed.

Selection of Imaging Data for Generating the Synthetic Imaging Data

Figure 4:
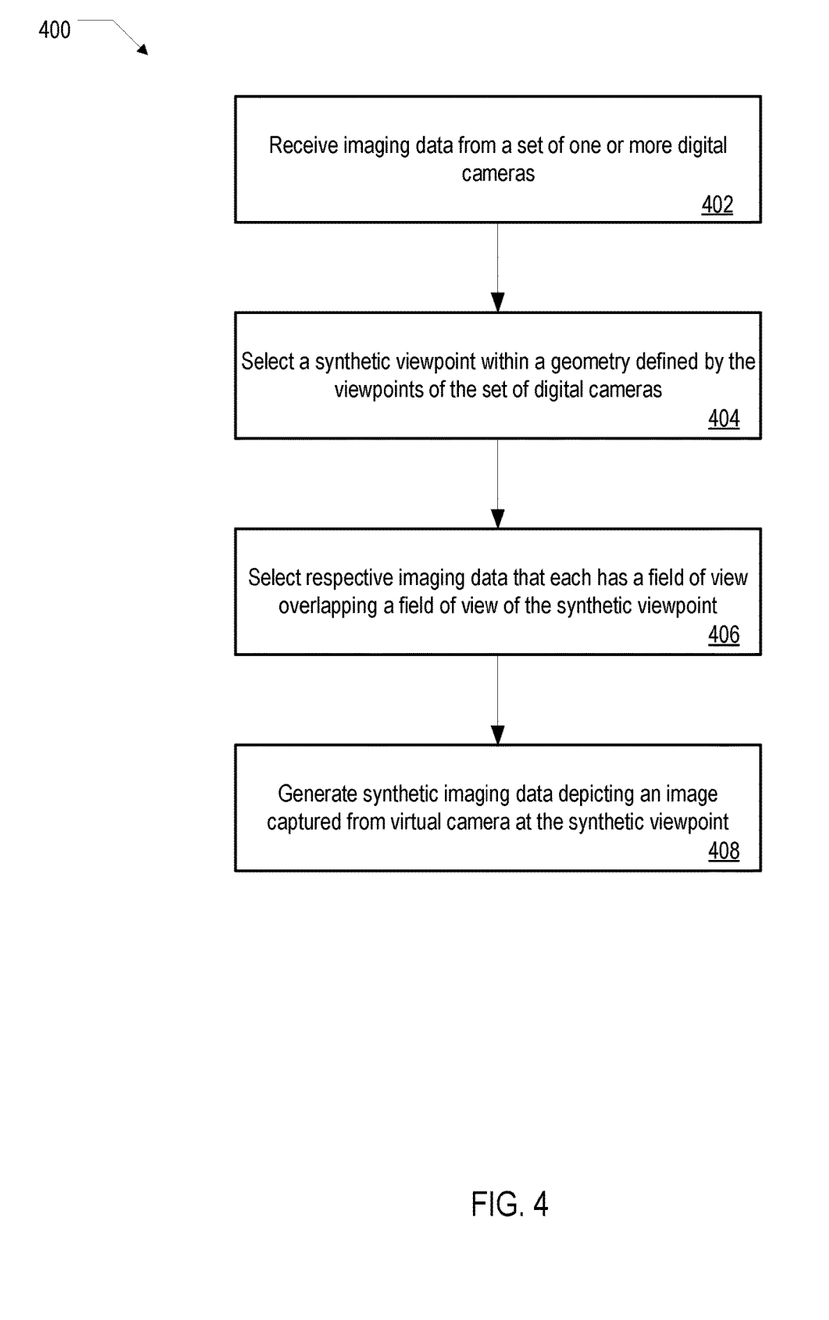
FIG. 4 is a flowchart of an example process for generating synthetic imaging data from a synthetic viewpoint.

FIG. 4 is a flowchart of an example process 400 for generating synthetic imaging data from a synthetic viewpoint. A digital processing apparatus receives imaging data from a set of one or more digital cameras (402). Each digital camera has a different viewpoint and a field of view that overlaps with a field of view of at least one other digital camera in the set of digital cameras.

A synthetic viewpoint is selected within a geometry defined by the viewpoints of the set of digital cameras (404). For example, a user may, by use of a user device, select a synthetic viewpoint by selecting a non-central point in an image. The synthetic viewpoint will then "shift" so that the camera appears to be centered on the point in the image that the user selected.

In another implementation, the selection of a synthetic viewpoint (or a request for a synthetic viewpoint) may be based in part on a gesture of a subject depicted within the imaging data of one or more of a set of digital cameras. A subject may be a person, robot or other subject of interest located within the imaging data. A gesture may be waving a hand in a certain way, pointing with a finger or pointing device (e.g., laser point), or another movement by a subject and captured within the imaging data. The image processing apparatus 112 is programmed to recognize certain gestures, e.g., by machine learning, for example. In response to recognizing the gestures, the location in the image is determined and a synthetic viewpoint that is centered on the gesture is selected.

The gesture may also invoke other commands, such as a zoom. For example, a person may draw an equation on a whiteboard and then gesture to zoom in on the equation by placing one hand above the equation and one hand below the equation and closing both hands together slowly. Such command may be recognized by use of machine learning.

The synthetic viewpoint has a field of view. The field of view may be fixed, or, alternatively, may be selected by the user. For the selected synthetic viewpoint, the image processing apparatus 112 selects respective imaging data from each of the digital cameras determined to have a field of view that overlaps with the field of view of the synthetic viewpoint (406).

The image processing apparatus 112 generates synthetic imaging data from the respective selected imaging data and depicts an image such that the image is captured from a virtual camera position at the synthetic viewpoint (408).

In some implementations synthetic imaging data generated for a synthetic viewpoint may specify a zoom level (e.g., higher zoom or lower zoom) that is different from actual zoom levels of respective imaging data from two or more digital cameras. For example, the synthetic imaging data generated may be used to depict an image at a higher zoom level that the zoom levels of each digital camera used to construct the image, such as in the example of the "zoom in" command described above.

Moreover, synthetic imaging data may be used to generate multiple different images at different times or simultaneously. The multiple different images may be provided to one or more user devices. In some implementations, two or more user devices may receive synthetic imaging data for displaying the same image, different images, or a combination thereof.

In some implementations, augmented reality information can be inserted into synthetic images. This can be readily facilitated by the system as the system is already generating the synthetic image. For example, if the image is of a speaker, and the synthetic viewpoint result in an image with a side view of the speaker's face, input from other cameras may be used to "rotate" the speaker so that the speaker appears to be facing the synthetic viewpoint. This can be done, for example, by a user selecting an object within an image and then selecting an alternate synthetic viewpoint for the object. The portion of the image for which the alternate synthetic viewpoint is selected can be inserted into the synthetic image.

Other types of augmented reality techniques can also be used, such as inserting objects, selectable links, and other information into the synthetic image.

In situations in which the systems discussed here collect personal information about users, or may make use of personal information, the users may be provided with an opportunity to control whether applications or features collect user information (e.g., information about a user's social network, social actions or activities, profession, a user's preferences, or a user's current location), or to control whether and/or how to receive content that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system, comprising:
a data processing apparatus;
a non-transitory memory storage in data communication with the data processing apparatus and storing instructions executable by the data processing apparatus and that upon such execution cause the data processing apparatus to perform operations comprising:
for a set of two or more digital cameras, receiving from each digital camera in the set respective imaging data from the digital camera, and wherein each digital camera in the set has a viewpoint that is different from the viewpoints of each other digital camera in the set and has a field of view that is overlapping with at least one other digital camera in the set such that the respective imaging data from each digital camera includes overlapping imaging data from at least one other digital camera; and
for each of a plurality of synthetic viewpoints, where each synthetic viewpoint is a viewpoint that is within a geometry defined by the viewpoints of the digital cameras in the set, and each synthetic viewpoint is different from each other synthetic viewpoint:
selecting respective imaging data that each has a field of view that overlaps a field of view of the synthetic viewpoint, comprising:
determining a minimal subset of digital cameras required to generate synthetic imaging data that depicts an image captured from a virtual camera positioned at the synthetic viewpoint, wherein the minimal subset of digital cameras is a proper subset of the set of digital cameras, and
selecting respective imaging data from only digital cameras in the minimal subset of digital cameras; and
generating, from the selected respective imaging data, synthetic imaging data that depicts an image captured from a virtual camera positioned at the synthetic viewpoint.

2. The system of claim 1, wherein generating the synthetic imaging data for a synthetic viewpoint comprises generating synthetic imaging data based on a synthetic zoom level that is different from an actual zoom level of each digital camera.

3. The system of claim 1, wherein the synthetic imaging data is provided to a user device for display by the user device.

4. The system of claim 1, wherein a three-dimensional stereoscopic image is generated from synthetic imaging data depicting two different images captured from two different synthetic viewpoints, respectively.

5. The system of claim 1, wherein the viewpoints for each digital camera in the set of two or more digital cameras defines a line.

6. The system of claim 1, wherein the viewpoints for each digital camera in the set of two or more digital cameras defines a two-dimensional area.

7. The system of claim 1, wherein the viewpoints for each digital camera in the set of two or more digital cameras defines a three-dimensional volume.

8. The system of claim 1, wherein generating the synthetic imaging data comprises generating the synthetic imaging data from portions of the selected respective imaging data from digital cameras that are determined to be unobstructed relative to a subject to be depicted in the synthetic imaging data.

9. The system of claim 1, wherein generating the synthetic imaging data comprises generating the synthetic imaging data from all the selected respective imaging data, including selected respective imaging data from digital cameras that are determined to be obstructed relative to a subject to be depicted in the synthetic imaging data.

10. The system of claim 1, wherein generating the synthetic imaging data further comprises generating an augmented reality virtual object.

11. The system of claim 1, further comprising selecting at least one of the synthetic viewpoints based on a gesture of a subject depicted within the imaging data of at least one of the digital cameras.

12. The system of claim 1, further comprising selecting at least one of the synthetic viewpoints based on a user device selection of a synthetic viewpoint.

13. A system, comprising:
a data processing apparatus;
a non-transitory memory storage in data communication with the data processing apparatus and storing instructions executable by the data processing apparatus and that upon such execution cause the data processing apparatus to perform operations comprising:
for a set of two or more digital cameras, receiving from each digital camera in the set respective imaging data from the digital camera, and wherein each digital camera in the set has a viewpoint that is different from the viewpoints of each other digital camera in the set and has a field of view that is overlapping with at least one other digital camera in the set such that the respective imaging data from each digital camera includes overlapping imaging data from at least one other digital camera; and
for each of a plurality of synthetic viewpoints, where each synthetic viewpoint is a viewpoint that is within a geometry defined by the viewpoints of the digital cameras in the set, and each synthetic viewpoint is different from each other synthetic viewpoint:
selecting respective imaging data that each has a field of view that overlaps a field of view of the synthetic viewpoint, comprising determining, for each digital camera for which the respective imaging data has been selected, whether the digital camera is obstructed relative to a subject to be depicted in synthetic imaging data that depicts an image captured from a virtual camera positioned at the synthetic viewpoint; and
generating synthetic imaging data that depicts an image captured from a virtual camera positioned at the synthetic viewpoint from only the selected imaging data from digital cameras that are not determined to be obstructed.

14. The system of claim 13, wherein determining whether the digital camera is obstructed relative to a subject to be depicted in the synthetic imaging data comprises determining that the digital camera is obstructed when a similarity measure that measures a similarity of the imaging data of the digital camera to the imaging data of other selected respective imaging data does not meet a similarity threshold.

15. A non-transitory computer storage medium storing instructions executable by a data processing apparatus and that upon such execution cause the data processing apparatus to perform operations comprising:
for a set of two or more digital cameras, receiving from each digital camera in the set respective imaging data from the digital camera, and wherein each digital camera in the set has a viewpoint that is different from the viewpoints of each other digital camera in the set and has a field of view that is overlapping with at least one other digital camera in the set such that the respective imaging data from each digital camera includes overlapping imaging data from at least one other digital camera; and
for each of a plurality of synthetic viewpoints, where each synthetic viewpoint is a viewpoint that is within a geometry defined by the viewpoints of the digital cameras in the set, and each synthetic viewpoint is different from each other synthetic viewpoint:
selecting respective imaging data that each has a field of view that overlaps a field of view of the synthetic viewpoint, comprising:
determining a minimal subset of digital cameras required to generate synthetic imaging data that depicts an image captured from a virtual camera positioned at the synthetic viewpoint, wherein the minimal subset of digital cameras is a proper subset of the set of digital cameras, and
selecting respective imaging data from only digital cameras in the minimal subset of digital cameras; and
generating, from the selected respective imaging data, synthetic imaging data that depicts an image captured from a virtual camera positioned at the synthetic viewpoint.

16. A computer implemented method, comprising:
for a set of two or more digital cameras, receiving from each digital camera in the set respective imaging data from the digital camera, and wherein each digital camera in the set has a viewpoint that is different from the viewpoints of each other digital camera in the set and has a field of view that is overlapping with at least one other digital camera in the set such that the respective imaging data from each digital camera includes overlapping imaging data from at least one other digital camera; and
for each of a plurality of synthetic viewpoints, where each synthetic viewpoint is a viewpoint that is within a geometry defined by the viewpoints of the digital cameras in the set, and each synthetic viewpoint is different from each other synthetic viewpoint:
selecting respective imaging data that each has a field of view that overlaps a field of view of the synthetic viewpoint, comprising:
determining a minimal subset of digital cameras required to generate synthetic imaging data that depicts an image captured from a virtual camera positioned at the synthetic viewpoint, wherein the minimal subset of digital cameras is a proper subset of the set of digital cameras, and
selecting respective imaging data from only digital cameras in the minimal subset of digital cameras; and
generating, from the selected respective imaging data, synthetic imaging data that depicts an image captured from a virtual camera positioned at the synthetic viewpoint.

* * * * *